3,361,745
1 - ALKENYL - 3 - ALKYL - 6 - AMINO - 5 - (SUB-
STITUTED - METHYLENEAMINO) - 1,2,3,4 - TET-
RAHYDRO-2,4-PYRIMIDINEDIONES
Elmer F. Schroeder, Chicago, Ill., assignor to G. D. Searle
& Co., Chicago, Ill., a corporation of Delaware
No Drawing. Filed Oct. 14, 1964, Ser. No. 403,916
14 Claims. (Cl. 260—240)

The invention described in detail hereinafter is concerned with novel chemical compounds characterized by a methyleneamino moiety attached to a heterocyclic ring system. They are, more particularly, 1-alkenyl-3-alkyl-6-amino-5-(substituted-methyleneamino) - 1,2,3,4 - tetrahydro-2,4-pyrimidinediones and are represented by the following structural formula

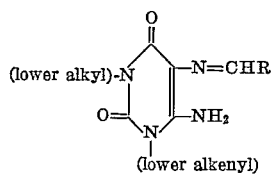

wherein R can be a 2-furyl, 2-quinolyl, pyridyl, or radical of the formula

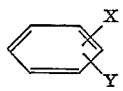

wherein X and Y are selected from the group consisting of hydroxy, acetamido, methoxy, and chloro radicals or X and Y together comprise the methylenedioxy group.

Typical of the lower alkyl radicals designated in the foregoing structural representation are methyl, ethyl, propyl, butyl, pentyl, hexyl and the branched-chain groups isomeric therewith. The lower alkenyl radicals symbolized therein are, for example, vinyl, allyl, propenyl, butenyl, crotyl, pentenyl, hexenyl, and the branched-chain radicals thereof.

Compounds represented by the following structural formula

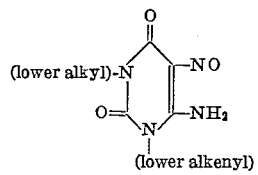

are suitable starting materials for the manufacture of the novel compounds of the present invention. Those 5-nitroso compounds are contacted with a reducing agent, for example ammonium sulfide or sodium hydrosulfite, to afford the intermediate 5,6-diamino compounds. As a specific example, 1-allyl-3-ethyl-5-nitroso-6-amino-1,2,3,4-tetrahydro-2,4-pyrimidinedione, in aqueous ammonia, is contacted with sodium hydrosulfite, thus producing 1-allyl-3-ethyl - 5,6-diamino - 1,2,3,4-tetrahydro-2,4-pyrimidinedione.

Condensation of the aforementioned 5,6-diamino intermediates with an appropriate carbonyl compound results in the instant substituted-methyleneamino substances. This process is conveniently conducted by heating a mixture of the reactants in a suitable polar inert organic solvent. The product usually separates in crystalline form directly from the reaction mixture and can be isolated by filtration. Illustrative of that process is the reaction of 1-allyl-3-ethyl-5,6-diamino - 1,2,3,4-tetrahydro-2,4 - pyrimidinedione with pyridine-3-carboxaldehyde in refluxing ethanol to yield 1-allyl-3-ethyl - 6 - amino-5-(3-pyridyl-methyleneamino)-1,2,3,4-tetrahydro-2,4-pyrimidinedione.

The compounds of this invention are useful as a result of their valuable pharmacological properties. They exhibit, for example, anti-inflammatory, diuretic, hypocholesterolemic, hypotensive, and anti-ulcerogenic activity. They are also pepsin-inhibitory agents. These compounds, in addition, possess anti-algal and anti-bacterial properties as evidenced by their ability to inhibit the growth of such organisms as *Chlorella vulgaris* and *Diplococcus pneumoniae*. They are, furthermore, inhibitors of dicotyledonous seed germination.

The compounds which constitute this invention and methods for their production will appear more fully from the examples which follow. These examples, however, are given for the purpose of illustration only and are not to be construed as limiting the invention either in spirit or in scope. In these examples, temperatures are given in degrees centigrade (° C.) and quantities of materials in parts by weight unless otherwise noted.

*Example 1*

To a mixture of 44.8 parts of 1-allyl-3-ethyl-5-nitroso-6-amino-1,2,3,4-tetrahydro-2,4-pyrimidinedione, 500 parts of water and 49.5 parts of concentrated ammonium hydroxide, at about 40°, is added 70 parts of sodium hydrosulfite, resulting in a rapid temperature rise to about 70°. After the initial exothermic reaction subsides, the reaction mixture is heated at about 80–85° for about 10 minutes longer, then is cooled and extracted with methylene chloride. This organic extract is dried over anhydrous sodium sulfate and is evaporated to dryness. Recrystallization of the tan-colored residue from ethyl acetate results in pure colorless crystals of 1-allyl-3-ethyl-5,6-diamino-1,2,3,4-tetrahydro-2,4-pyrimidinedione, melting at about 143–145°.

*Example 2*

The substitution of an equivalent quantity of 1-methallyl-3-ethyl-5-nitroso-6-amino - 1,2,3,4 - tetrahydro-2,4-pyrimidinedione in the procedure of Example 1 results in 1-methallyl - 3 - ethyl - 5,6-diamino-1,2,3,4-tetrahydro-2,4-pyrimidinedione.

*Example 3*

The substitution of an equivalent quantity of 1-allyl-3-methyl-5-nitroso-6-amino - 1,2,3,4-tetrahydro-2,4-pyrimidinedione in the procedure of Example 1 results in 1-allyl-3-methyl-5,6-diamino-1,2,3,4 - tetrahydro-2,4-pyrimidinedione.

*Example 4*

A mixture of 2.1 parts of 1-allyl-3-ethyl-5,6-diamino-1,2,3,4-tetrahydro-2,4-pyrimidinedione, 1.54 parts of p-chlorobenzaldehyde and 32 parts of absolute ethanol is heated at the reflux temperature for about 30 minutes, then is cooled and allowed to stand until crystallization of the product is complete. These crystals are collected by filtration, washed on the filter with ethanol, then recrystallized from ethanol to afford 1-allyl-3-ethyl-6-amino - 5-(4-chlorobenzylideneamino)-1,2,3,4-tetrahydro-2,-4-pyrimidinedione as a bright yellow solid, melting at about 168–170°. This compound is represented by the following structural formula

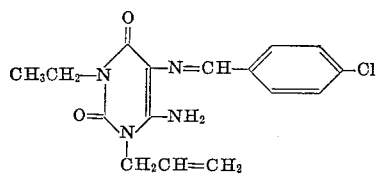

*Example 5*

A mixture containing 2.1 parts of 1-allyl-3-ethyl-5,6-diamino - 1,2,3,4-tetrahydro-2,4-pyrimidinedione, 1.06 parts of furfuraldehyde and 32 parts of absolute ethanol is heated at the reflux temperature for about 30 minutes, during which time complete solution occurs. The reaction mixture is then cooled, and the crystals which separate are collected by filtration, washed on the filter with ethanol and dried. Recrystallization of the crude product from ethanol affords tan-colored crystals of 1-allyl-3-ethyl-6-amino - 5 - (furfurylideneamino)-1,2,3,4-tetrahydro-2,4-pyrimidinedione, melting at about 167–169°. This compound can be represented by the following structural formula

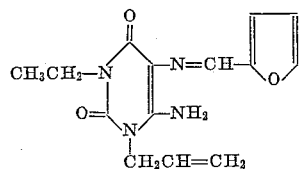

*Example 6*

A mixture of 4.2 parts of 1-allyl-3-ethyl-5,6-diamino-1,2,3,4 - tetrahydro-2,4-pyrimidinedione, 2.36 parts of pyridine-3-carboxaldehyde and 64 parts of absolute ethanol is heated at the reflux temperature for about 30 minutes. The crystals which form upon cooling are collected by filtration, washed on the filter with cold ethanol and dried to afford the crude product. Recrystallization from ethanol results in light yellow crystals of 1-allyl-3-ethyl-6 - amnio-5-(3-pyridylmethyleneamino)-1,2,3,4-tetrahydro-2,4-pyrimidinedione, melting at about 204–206°. This compound is characterized further by the following structural formula

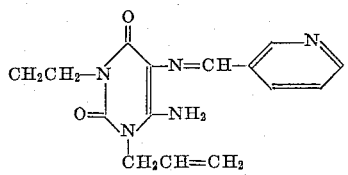

*Example 7*

A mixture of 2.1 parts of 1-allyl-3-ethyl-5,6-diamino-1,2,3,4 - tetrahydro-2,4-pyrimidinedione, 1.96 parts of 3,4,5- trimethoxybenzaldehyde and 32 parts of absolute ethanol is heated at the reflux temperature for about 30 minutes. Cooling of the reaction mixture results in separaton of the crystalline product, which is collected by filtration and washed on the filter with cold ethanol, then dried. Recrystallization from ethanol affords light yellow crystals of pure 1-allyl-3-ethyl-6-amino-5-(3,4,55-trimethoxybenzylideneamino) - 1,2,3,4-tetrahydro-2,4-pyrimidinedione, melting at about 188–190°. This compound is represented by the following structural formula

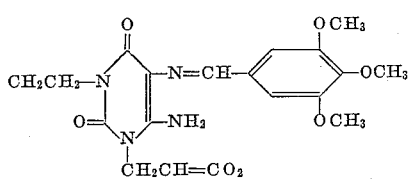

*Example 8*

A mixture of 4.2 parts of 1-allyl-3-ethyl-5,6-diamino-1,2,3,4-tetrahydro-2,4-pyrimidinedione, 3.45 parts of quinoline-2-carboxaldehyde and 64 parts of absolute ethanol is heated at the reflux temperature for about 30 minutes, then is cooled to room temperature. The resulting crystals are collected by filtration, washed with cold ethanol on the filter and dried to afford the crude product. Recrystallization from ethanol yields pure 1-allyl-3-ethyl-6-amino-5 - (2-quinolinylmethyleneamino)-1,2,3,4-tetrahydro-2,4-pyrimidinedione, melting at about 198–200°. It is further characterized by the following structural formula

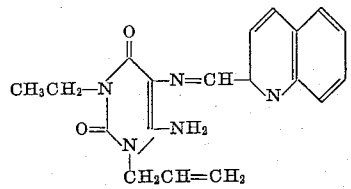

*Example 9*

A mixture of 4.2 parts of 1-allyl-3-ethyl-5,6-diamino-1,2,3,4 - tetrahydro-2,4-pyrimidinedione, 2.36 parts of pyridine-4-carboxaldehyde and 64 parts of absolute ethanol is heated at the reflux temperature for about 30 minutes. The crystals which separate upon cooling are collected by filtration, washed on the filter with cold ethanol and dried. Recrystallization of the resulting crude product from ethanol affords pure 1-allyl-3-ethyl-6-amino-5-(4 - pyridylmethyleneamino)-1,2,3,4-tetrahydro-2,4-pyrimidinedione, melting at about 193–195°. This compound can be represented by the following structural formula

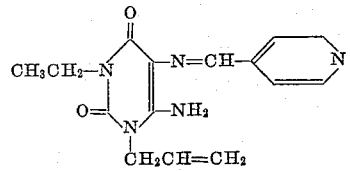

*Example 10*

A mixture of 2.1 parts of 1-allyl-3-ethyl-5,6-diamino-1,2,3,4-tetrahydro-2,4-pyrimidinedione, 1.52 parts of 2,4-dihydroxybenzaldehyde and 32 parts of absolute ethanol is heated at the reflux temperature for about 30 minutes. The crystalline product which separates upon cooling to room temperature is collected by filtration, washed on the filter with cold ethanol and dried. Purification of that crude product by recrystallization from ethanol affords pure 1-allyl-3-ethyl-6-amino - 5 - (2,4 - dihydroxybenzylideneamino)-1,2,3,4 - tetrahydro - 2,4 - pyrimidinedione, melting at about 224–226°. This compound is represented by the following structural formula

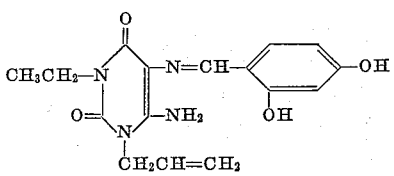

*Example 11*

A mixture of 4.2 parts of 1-allyl-3-ethyl-5,6-diamino-1,2,3,4-tetrahydro-2,4-pyrimidinedione, 3.58 parts of p-acetamidobenzaldehyde and 64 parts of absolute ethanol is heated at the reflux temperature for about 30 minutes. The crystals which separate on cooling are collected by filtration, washed on the filter with cold ethanol, then dried to afford the crude product. Recrystallization of that solid material from ethanol yields 1-allyl-3-ethyl-6-amino-5-(4 - acetamidobenzylideneamino) - 1,2,3,4-tetrahydro-2,4-pyrimidinedione, melting at about 254–256°. This compound can be represented by the following structural formula

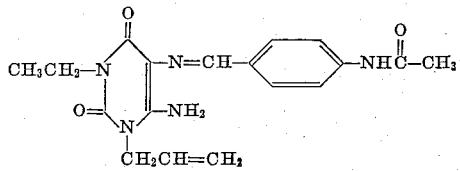

Example 12

A mixture of 2.1 parts of 1-allyl-3-ethyl-5,6-diamino-1,2,3,4-tetrahydro-2,4-pyrimidinedione, 1.65 parts of 3,4-methylenedioxybenzaldehyde and 32 parts of absolute ethanol is heated at the reflux temperature for about 30 minutes. The crystals which separate from the reaction mixture upon cooling to room temperature are collected by filtration, then washed on the filter with cold ethanol and dried in air. Recrystallization of that crude product from ethanol affords colorless needle-like crystals of pure 1-allyl-3-ethyl-6-amino - 5 - (3,4-methylenedioxybenzylideneamino)-1,2,3,4-tetrahydro - 2,4 - pyrimidinedione, melting at about 189–191°. It is represented by the following structural formula

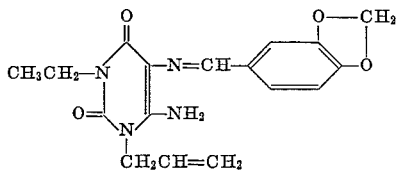

Example 13

A mixture of 4.2 parts of 1-allyl-3-ethyl-5,6-diamino-1,2,3,4-tetrahydro-2,4-pyrimidinedione, 2.69 parts of salicylaldehyde and 64 parts of absolute ethanol is heated at the reflux temperature for about 30 minutes. Filtration of the crystals which separate upon cooling followed by washing of those crystals on the filter with cold ethanol and drying in air affords the crude product. Recrystallization of the latter material from ethanol yields pure 1-allyl-3-ethyl-6-amino-5-(2 - hydroxybenzylideneamino)-1,2,3,4-tetrahydro-2,4-pyrimidinedione as a bright yellow solid, melting at about 165–167°. This compound is represented by the following structural formula

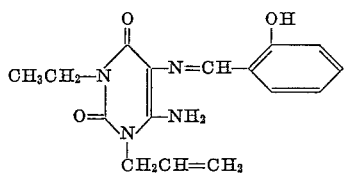

Example 14

A mixture of 4.2 parts of 1-allyl-3-ethyl-5,6-diamino-1,2,3,4-tetrahydro-2,4-pyrimidinedione, 3.35 parts of 3-methoxy-4-hydroxybenzaldehyde and 64 parts of absolute ethanol is heated at the reflux temperature for about 45 minutes, during which reaction period the mixture becomes homogeneous. Cooling of that mixture to room temperature followed by dilution with approximately 120 parts of water results in crystallization of the crude product, which is collected by filtration, washed on the filter with aqueous ethanol, and dried in air. That crude material is purified by recrystallization first from ethyl acetate, then from ethanol to produce 1-allyl-3-ethyl-6-amino-5-(3-methoxy-4-hydroxybenzylideneamino) - 1,2,3,4-tetrahydro-2,4-pyrimidinedione as a light yellow solid, melting at about 220–225°. This compound is characterized further by the following structural formula

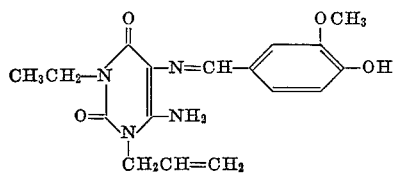

Example 15

By substituting an equivalent quantity of 1-methallyl-3-ethyl-5,6-diamino-1,2,3,4 - tetrahydro-2,4-pyrimidinedione and otherwise proceeding according to the processes described in Example 6, there is obtained 1-methallyl-3-ethyl-6-amino-5 - (3 - pyridylmethyleneamino) - 1,2,3,4-tetrahydro-2,4-pyrimidinedione.

Example 16

The substitution of an equivalent quantity of 1-allyl-3-methyl-5,6-diamino-1,2,3,4 - tetrahydro-2,4-pyrimidinedione in the procedure of Example 10 results in 1-allyl-3-methyl-6-amino-5 - (2,4 - dihydroxybenzylideneamino)-1,2,3,4-tetrahydro-2,4-pyrimidinedione of the structural formula

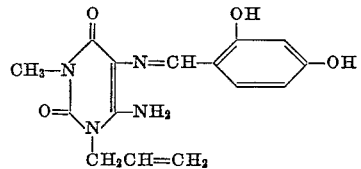

What is claimed is:

1. A compound of the formula

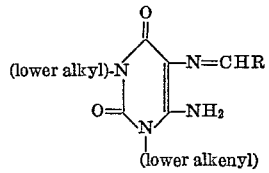

wherein R is selected from the group of radicals consisting of 2-furyl, pyridyl, 2-quinolyl and those of the formula

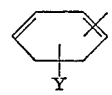

wherein X and Y are members of the class consisting of hydroxy, acetamido, methoxy, and chloro radicals, and X and Y together comprise the methylenedioxy group.

2. A compound of the formula

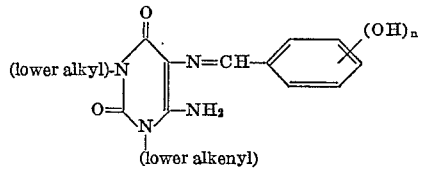

wherein $n$ is a positive integer less than 3.

3. A compound of the formula

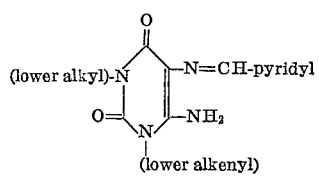

4. 1-allyl-3-ethyl - 6 - amino-5-(4-chlorobenzylidineamino)-1,2,3,4-tetrahydro-2,4-pyrimidinedione.

5. 1-allyl-3-ethyl - 6 - amino-5-(furfurylideneamino)-1,2,3,4-tetrahydro-2,4-pyrimidinedione.

6. 1-allyl-3-ethyl-6-amino - 5 - (3-pyridylmethyleneamino)-1,2,3,4-tetrahydro-2-4-pyrimidinedione.

7. 1-allyl-3-ethyl-6-amino - 5 - (3,4,5-trimethoxybenzylideneamino)-1,2,3,4-tetrahydro-2,4-pyrimidinedione.

8. 1-allyl-3-ethyl-6-amino - 5 - (2-quinolinylmethyleneamino)-1,2,3,4-tetrahydro-2,4-pyrimidinedione.

9. 1-allyl-3-ethyl-6-amino - 5 - (4-pyridylmethyleneamino)-1,2,3,4-tetrahydro-2,4-pyrimidinedione.

10. 1-allyl-3-ethyl-6-amino - 5 - (2,4-dihydroxybenzylideneamino)-1,2,3,4-tetrahydro-2,4-pyrimidinedione.

11. 1-allyl-3-ethyl-6-amino-5-(4-acetamido-benzylideneamino)-1,2,3,4-tetrahydro-2,4-pyrimidinedione.

12. 1-allyl-3-ethyl-6-amino-5-(3,4-methylenedioxybenzylideneamino)-1,2,3,4-tetrahydro-2,4-pyrimidinedione.

13. 1-allyl-3-ethyl-6-amino-5-(2-hydroxybenzylideneamino)-1,2,3,4-tetrahydro-2,4-pyrimidinedione.

14. 1-allyl-3-ethyl-6-amino-5-(3-methoxy-4-hydroxybenzylideneamino)-1,2,3,4-tetrahydro-2-4-pyrimidinedione.

References Cited

Bredereck et al., Berichte, vol. 95, pp. 1902–09 (1962).

WALTER A. MODANCE, *Primary Examiner.*

H. MOATZ, *Assistant Examiner.*